May 4, 1926.
T. H. THOMAS
1,582,942
PRESSURE GAUGE
Filed Oct. 16, 1922
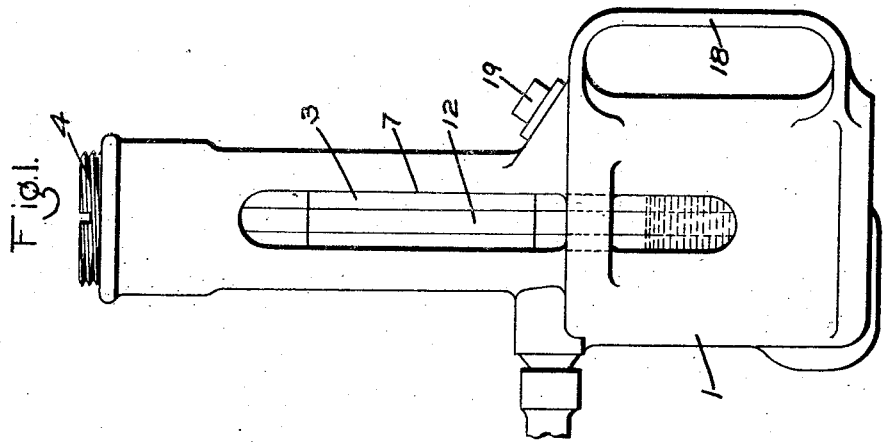
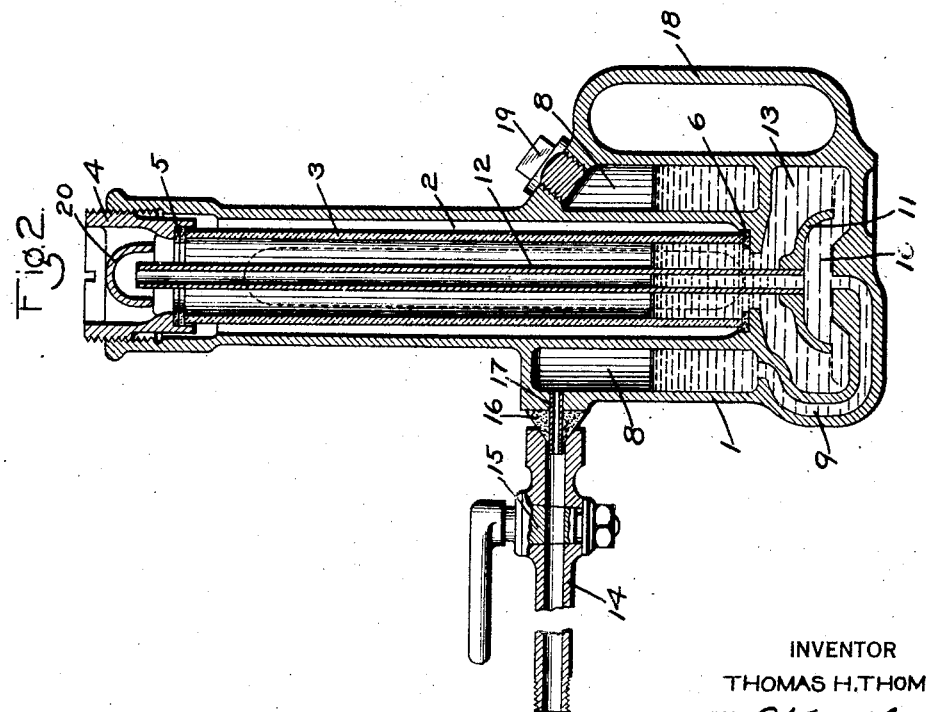
INVENTOR
THOMAS H. THOMAS
BY *Wm. M. Cady*
ATTORNEY Patented May 4, 1926.

1,582,942

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PRESSURE GAUGE.

Application filed October 16, 1922. Serial No. 594,741.

*To all whom it may concern:*

Be it known that I, THOMAS H. THOMAS, a citizen of the United States, residing at Edgewood, in the county of Allegheny and State of Pennsylvania, have invented new and useful Improvements in Pressure Gauges, of which the following is a specification.

This invention relates to pressure gauges for testing the rate of leakage of fluid under pressure past a valve, such as the slide valve of the well known triple valve device employed in fluid pressure brake equipments.

The principal object of my invention is to provide an improved valve leakage testing device.

In the accompanying drawing: Fig. 1 is an elevational view of a testing device embodying my invention; and Fig. 2 a central sectional view thereof.

As shown in the drawing, the testing device may comprise a casing 1 having a vertical cylindrical chamber 2 within which is mounted a glass tube 3. The tube 3 is held in position by means of a screw plug 4 which is adapted to clamp the tube 3 between gaskets 5 and 6, the gaskets providing liquid tight joints. An elongated slot 7 is provided in the casing 1, so that the level of liquid in the glass tube 3 may be viewed.

In the base portion of the casing 1 there is provided an annular chamber 8 connected by a passage 9 with the space 10 below a deflecting plate 11 which also serves as a support for a vent tube 12 extending centrally of the glass tube 3. The space 10 is open through passages around the plate 11 to an annular chamber 13 which communicates with the interior of the glass tube 3.

A screw threaded pipe section 14 having a cock 15 is provided and at one end the pipe section is provided with an interior conical seat for receiving a cone shaped seating gasket 16 which is secured to the casing 1 and surrounds a tube 17 through which fluid under pressure is supplied to chamber 8. The casing 1 may be provided with a handle 18 by which the testing device may be manually held in position for conducting a test.

The chamber 8 is filled with liquid, such as water, to a certain level, through an opening provided by removing a screw plug 19, such as the liquid level indicated in the drawing.

When fluid under pressure is supplied through tube 17 to chamber 8, the liquid in said chamber will be forced out at a rate proportional to the rise in fluid pressure. The liquid forced out of chamber 8 will flow through passage 9 to the space 10 and thence around the plate 11 to the chamber 13. The liquid will then be forced up in the glass tube 3 as well as in the vent tube 12.

The construction above described serves to indicate the rate of leakage past a valve and for this purpose the glass tube 3 is calibrated and marked at points such that when the leakage is at a certain rate, the liquid level in the glass tube 3 will rise from one marked point to another marked point in a predetermined time. If the level rises at a greater rate, then the leakage is considered too great and if the level rises at a lesser rate, then the leakage is considered within the prescribed limit.

With a heavy leakage rate, it is possible that the rise in fluid pressure may be sufficient to cause the liquid in chamber 8 to be forced out of said chamber and through passage 9 into the space 10, and should the liquid level rise above the inlet to the vent tube 12, the fluid being lighter than the liquid will tend to rise through the liquid in the form of bubbles, taking the more direct path through the liquid in the vent tube 12, particularly as the deflecting plate 11 would compel the bubbles to take a downward course in order to escape into the space 13. As a bubble of fluid reaches the top of the vent tube, some of the liquid above the bubble may be forced out of the tube. Any liquid thus forced out of the vent tube will then be thrown back into the glass tube 3 by the deflecting cap 20. The excessive fluid pressure entering the chamber 8 is thus relieved by escape through the vent tube 12, thus preventing the main body of liquid from being blown out at the upper outlet of the device.

Having now described my invention, what I claim as new and desire to secure by Letters Patent, is:—

1. In a testing device, the combination with a casing having a chamber containing liquid adapted to be subjected to fluid under pressure, of a liquid level viewing tube communicating with a second chamber in the casing and a vent tube arranged in said viewing tube, the two chambers being connected by a passageway having its outlet opening to the second chamber directly below the inlet of said vent tube.

2. In a testing device, the combination with a casing having a chamber containing a liquid adapted to be subjected to fluid under pressure, of a liquid level viewing tube having a liquid inlet open to a second chamber, a vent tube having a liquid inlet within said second chamber, said chambers being provided with a communicating passageway through which liquid is supplied from the first to the second chamber at a point beneath the vent tube inlet, and a baffle plate secured to the inlet end of said vent tube and partially enclosing the space below said inlet end.

In testimony whereof I have hereunto set my hand.

THOMAS H. THOMAS.